US006590928B1

(12) United States Patent
Haartsen

(10) Patent No.: US 6,590,928 B1
(45) Date of Patent: *Jul. 8, 2003

(54) FREQUENCY HOPPING PICONETS IN AN UNCOORDINATED WIRELESS MULTI-USER SYSTEM

(75) Inventor: Jacobus Cornelis Haartsen, Borne (NL)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 332 days.

(21) Appl. No.: 08/932,911

(22) Filed: Sep. 17, 1997

(51) Int. Cl.[7] ............................................. H04L 27/30
(52) U.S. Cl. ....................................... 375/134; 375/137
(58) Field of Search ................................ 375/200, 202, 375/134, 132, 133, 135, 136, 137; 380/34

(56) References Cited

U.S. PATENT DOCUMENTS

| 4,466,060 A | | 8/1984 | Riddle |
| 5,274,666 A | * | 12/1993 | Dowdell et al. ............... 375/1 |
| 5,287,384 A | | 2/1994 | Avery et al. |
| 5,412,654 A | | 5/1995 | Perkins |
| 5,414,731 A | | 5/1995 | Antunes et al. |
| 5,515,509 A | | 5/1996 | Rom |
| 5,574,979 A | | 11/1996 | West |
| 5,729,680 A | * | 3/1998 | Belanger et al. ......... 395/200.1 |
| 5,896,375 A | | 4/1999 | Dent et al. |
| 5,940,431 A | | 8/1999 | Haartsen et al. |

FOREIGN PATENT DOCUMENTS

| EP | 0465090 A1 | 1/1992 |
| EP | 0695059 A1 | 1/1996 |

OTHER PUBLICATIONS

Matthijs A. Visser, et al., "Voice and Data Transmission over an 802.11 Wireless Network", Proc. of PIMRC '95, Toronto, Sep. 1995, pp. 648–652.

Adriaan Kamerman, "Spread–Spectrum Techniques Drive WLAN Performance", Microwaves & RF, Sep. 1996, pp. 109–114.

(List continued on next page.)

Primary Examiner—William Luther
(74) Attorney, Agent, or Firm—Burns, Doane, Swecker & Mathis, L.L.P.

(57) ABSTRACT

A wireless network includes master and slave units. The master sends a master address and clock to the slaves. Communication is by means of a virtual frequency hopping channel whose hopping sequence is a function of the master address, and whose phase is a function of the master clock. Transmitted inquiry messages solicit slave address and topology information from the slaves, which may be used to generate a configuration tree for determining a route for a connection between the master and slave units. Slave address and topology information may include an own address from each of the slave units and only first order address lists from each of the slave units. Generating the configuration tree involves generating a hierarchy of connectivity rings from the first order address lists. Each connectivity ring may be generated in accordance with a rule that a higher-numbered connectivity ring cannot include nodes representing units that are already represented by a node in a lower-numbered connectivity ring. Alternatively, each connectivity ring may be generated by considering a present numbered connectivity ring having parent nodes, and including in a next higher-numbered connectivity ring those nodes representing all children of the parent nodes such that no descendant of a parent can represent the same unit as the parent; no descendant of a parent's child can represent the same unit as any of the parent's children; and no child of any parent can have the same name as any other child of said any parent.

28 Claims, 9 Drawing Sheets

OTHER PUBLICATIONS

Joel DiGirolamo, "Defining the Home Network", Electronic Design, vol. 46, No. 7, Apr. 1997, p. 111.

"Wireless LAN Medium Access Control (MAC) and Physical Layer (PHY) Specifications", Draft Standard IEEE 802.11, P802.11/D1, pp. 10–17, Dec. 1994.

Dimitri Bertsekas, et al., "Data Networks", Second Edition, Prentice Hall, Inc., London 1992, pp. 378–387.

"Radio Equipment and Systems (RES); High Performance Radio Local Area Networks (HIPERLANs) Requirements and Architecture Strawman for Chapters 1–3", ETSI, Draft ETR XXX, Jul. 1996, cover page and pp. 2–14.

"Radio Equipment and Systems (RES); High Performance Radio Local Area Network (HPRLAN) Type 1; Functional Specification", ETSI, Final Draft ETS 300 652, Jun. 1996, cover page and pp. 17–23.

Federal Register/vol. 64, No. 146/Friday, Jul. 30, 1999, pp. 41392–41394.*

John Jubin, Janet D. Tornow, "The Darpa Packet Radio Network Protocols", Proceedings Of The IEEE, Jan., 1987, vol. 75, No. 1, pp. 21–32.

* cited by examiner

FREQUENCY HOPPING PICONETS IN AN UNCOORDINATED WIRELESS MULTI-USER SYSTEM

BACKGROUND

The present invention relates to uncoordinated wireless multi-user systems, and more particularly to self-organized connectivity in an uncoordinated wireless multi-user system.

Radio Local Area Networks (LAN) typically cover an area of technology where the computer industry and the wireless communications industry merge. Conventional computer networking has relied on wired LANs, typically packet-switched and targeted for data transfer. By contrast, wireless networking, and in particular cellular networking, has relied on wide area networks, typically circuit-switched and targeted for voice transfer. Most efforts in the design of radio LANs have reused the principles that are used in wired LANs. This, however, is a questionable procedure because the environments of the wired medium and of the wireless medium differ in important ways. Moreover, multimedia communications require additional features due to the special traffic characteristics posed by data, voice and video. Finally, the residential environment has its own requirements which can be decisive for the design of the system.

Almost one hundred percent of the computer networks today use a wired infrastructure. The wired medium can range from a simple twisted pair to an optical fiber. Due to its shielded and controllable environment, the wired medium is characterized by low interference levels and stable propagation conditions. Consequently, the wired medium has potential for high to very high data rates. Because of the latter, all participants in wired LANs typically share this single medium. The medium constitutes a single channel which is used by only a single one of a number of different users at any given time. Time-division multiplexing (TDM) is used to allow different users to access the channel at different times.

The protocols for accessing wired media have been standardized by the IEEE in its 802 series. Typically, multiple access reservation techniques like carrier-sensing (e.g., Ethernet, 802.3 Carrier-Sense Multiple Access/Collision Detect (CSMA/CD) or tokens (e.g., 802.4 token buses, or 802.5 token rings) are used to gain access to the medium. These protocols can be used in a distributed sense in that the user occupying the channel reserves the medium by its present transmission or by its token. In these schemes, every user can hear all traffic. That is, in a single LAN, all of the users share not only the channel, but all of the information carried on that channel as well. When the number of participants grows, the LAN can be divided into smaller LANs or segments, which channels operate independently. LANs can be interconnected via bridges or routers which form interfaces between the different local networks. These configurations result in more complex networks. For example, reference is made to D. Bertsekas and R. Callager, *Data Networks,* 2nd Edition, Prentice-Hall, London, 1992. For the discussion of the residential LANs, it suffices to consider the single LAN. The LAN typically provides a connectionless packet-switched service. Each packet has a destination address (and usually a source address as well) so that each user can determine whether the packet that passes by is intended for him or not.

It will be understood that the net throughput per user in a single LAN is determined by the peak data rate on the channel and by the number of users that share this channel. Even if the peak data rate is very high due to the wide band-width of the wireline medium, the effective user throughput can be low if the channel has to be shared among many users.

Since the type of communication that takes place over current wired LANs is asynchronous and connectionless, it is ill-suited for supporting delay-critical services like voice. Voice services demand synchronous or isochronous connections, which require priority techniques in the Medium Access Control (MAC) protocols in order to give voice users precedence over non-voice users. Different studies in existing data networks have shown that this is not a trivial task.

During the last several years, standards bodies in the United States and in Europe have worked on wireless LANs (WLANs). In the United States, this has resulted in the IEEE 802.11 standard (Draft standard IEEE 802.11, P802.11/D1, December 1994), whereas in Europe this has resulted in the ETSI HIPERLAN standard (ETSI, RES10/96/etr, "Radio Equipment and Systems (RES); High Performance Radio Local Area Networks (HIPERLANs), July 1996).

Looking first at the IEEE 802.11 standard, as the name indicates, it is an extension of the 802 LAN standard. The wireless connection is either a radio link or an infrared link. The radio medium is the Industrial, Scientific, Medical (ISM) band at 2.4 GHz. However, for a single radioLAN, only a 1–2 Mb/s channel is available at any given time. This relatively narrow channel has to be shared among all participants of the radio network. Both a configuration based on a wired infrastructure and a configuration based on an ad-hoc structure have been defined. With a wired infrastructure, the radio system merely provides a wireless extension between the wired LAN and the user terminal. Fixed access points interface between the wireline domain and wireless domain. In an ad hoc network, wireless units create their own wireless network. No wired backbone is involved at all. It is the ad hoc nature provided with wireless communications that gives the WLANs an important advantage over wired LANs in certain applications.

To avoid interference with other networks or other applications in the 2.4 GHz ISM band, either direct-sequence spreading or slow frequency hopping is used. Access to the channel is accomplished by a special form of Carrier-Sense Multiple Access/Collision Avoidance (CSMA/CA) that provides a connectionless service. In an architecture based on a wired infrastructure, the fixed part takes the role of a central controller which schedules all traffic. In an ad hoc architecture, the distributed CSMA/CA protocol provides the multiple access to the channel.

All in all, the IEEE 802.11 standard is very similar to that of the wired Ethernet, but wherein the wire has been replaced by a 1 Mb/s radio channel. It will be understood that the effective user throughput decreases quickly when the number of participants increases. In addition, since the spreading factor for Direct Sequence Spread Spectrum (DSSS) is only 11 and the hop rate for Frequency Hopping Spread Spectrum (FHSS) is only on the order of 10 to 20 hops/s, little immunity is provided against interference in the ISM band. Although different networks can theoretically coexist in the same area (different networks either use different DSSS carrier frequencies of which seven are defined, or use different FHSS hop sequences), thereby increasing the aggregate throughput. In fact, in A. Kamerman, "Spread-Spectrum Techniques Drive WLAN Performance," *Microwaves & RF,* September 1996, pp. 109–114, it was claimed that the aggregate throughput, defined as the average throughput per user times the number of co-located users (not necessarily participating in the same network), can never exceed 4–6 Mb/s with either technology. For co-locating different networks under the IEEE 802.11 standard it is preferred that the networks be based on a wired infrastructure: a limited number of co-located fixed access points can create their own network. A certain amount of coordination via the wired network is then possible. However, for networks based on an ad hoc structure, this is much more difficult under IEEE 802.11 because the MAC protocol does not lend itself to this creation. Instead, units that come in range of an ad hoc network will join an existing network and not create their own network.

HIPERLAN has followed a similar path as IEEE 802.11. The system operates in the 5.2 GHz band (not available in the United States). The standard is still under development and consists of a family of sub-standards, HIPERLAN 1 to 4. The most basic part, HIPERLAN 1 (ETSI, ETS 300652, "Radio Equipment and Systems (RES); High Performance Radio Local Area Networks (HIPERLAN) Type 1; Functional Specification," June 1996), is similar to the IEEE 802.11. Again, a single channel is used, but with a higher peak data rate of 23.5 Mb/s. A dedicated CSMA/CA scheme is used, called Elimination-Yield Non-Preemptive Priority Multiple Access (EY-NPMA) which provides a number of contention-based phases before the channel is reserved. Although the 5.2 GHz band is unlicensed in Europe, only HIPERLAN-type applications are allowed. Therefore, no special measures against unknown jammers are implemented. Different networks can coexist in the same area provided different 23 MHz wide channels are used. Out of the 5.2 GHz, five such channels have been defined.

One other interesting activity in the HIPERLAN area is the HIPERLAN 2 standardization which concentrates on wireless Asynchronous Transfer Mode (ATM). Presumably, this wireless network will also use the 5.2 GHz band, will support peak data rates around 40 Mb/s, and will use a centralized access scheme with some kind of demand assignment MAC scheme.

What the existing WLAN systems have in common with the wired LANs is that a single channel is shared among all the participants of the local network. All users share both the medium itself and all information carried over this medium. In the wired LAN, this channel can encompass the entire medium. However, this is not so in the radioLANs. In the radioLANs, the radio medium typically has a bandwidth of 80 to 100 MHz. Due to implementation limitations and cost of the radio transceivers, and due to restrictions placed by regulatory bodies like the FCC and ETSI, it is virtually impossible to define a radio channel in the radioLAN with the same bandwidth as the radio medium. Therefore, only part of the radio medium is used in a single LAN. As a result, the peak data rate over the channel decreases. But more importantly, the effective user throughput decreases because all participants share this channel, which is now much smaller than the medium. Although the medium is divided into different channels, each of which can be used to set up a different radioLAN, in practice, only a single network covers a certain area, especially when it concerns ad hoc networks. In radioLANs based on a wired infrastructure, the different channels can be used to create cells, each cell with its own network that is not disturbed by neighboring cells. This result is achieved at the expense of effort in planning the allocation of channels. In this way, a cellular structure is created that is similar to those encountered in cellular mobile systems. The use of different ad hoc radio networks in the same cell, however, is prohibited, thereby limiting the attainable aggregate throughput per unit area.

Considering now the transmission of voice by means of data links, this is still a problem in conventional systems because the wireless LAN standards reuse the multiple access schemes as encountered in the wired counterparts. As indicated in M. A. Visser, et al., "Voice and Data Transmission over 802.11 Wireless Network," Proc. of PIMRC '95, Toronto, September 1995, pp. 648–652, the use of these MAC protocols for the transmission of voice is not very appropriate either.

There is therefore a need for a cost-effective wireless replacement of a local network that can support both voice and data and is self-organized for an efficient use of the limited radio spectrum.

SUMMARY

It is therefore an object of the present invention to provide methods and apparatus for connecting devices wirelessly, making optimal usage of the allocated spectrum.

It is a further object to provide a connectivity structure in which units can set up point-to-point connections independently, without being hindered by point-to-point connections between other units sharing the same area and the same spectrum.

In accordance with one aspect of the present invention, the foregoing and other objects are achieved in a wireless network comprising: a master unit; and a slave unit. The master unit comprises: means for sending a master address to the slave unit; means for sending a master clock to the slave unit; and means for communicating with the slave unit by means of a virtual frequency hopping channel. The slave unit comprises: means for receiving the master address from the master unit; means for receiving the master clock from the master unit; and means for communicating with the master unit by means of the virtual frequency hopping channel. Furthermore, in this embodiment of the wireless network, a hopping sequence of the virtual frequency hopping channel is a function of the master address; and a phase of the hopping sequence is a function of the master clock.

In another aspect of the invention, the master unit in the wireless network further comprises means for transmitting an inquiry message that solicits a slave address from the slave unit; and the slave unit further comprises: means for receiving the inquiry message; and means, responsive to the inquiry message, for transmitting the slave address to the master unit.

In another aspect of the invention, the master unit in the wireless network further comprises: means for receiving slave address and topology information from more than one slave unit; and means for generating a configuration tree from the address and topology information.

In yet another aspect of the invention, the master unit in the wireless network further includes means for utilizing the configuration tree to determine a route for a connection between the master unit and the slave unit.

In still another aspect of the invention, the slave address and topology information comprises an own address from each of the more than one slave units and only first order address lists from each of the more than one slave units; and the means for generating the configuration tree from the address and topology information comprises: means for generating n connectivity rings from the first order address lists, wherein n is a positive integer, and wherein the generating means generates each of the connectivity rings in accordance with a rule that a higher-numbered connectivity ring cannot include nodes representing units that are already represented by a node in a lower-numbered connectivity ring.

In an alternative embodiment, the means for generating the configuration tree from the address and topology information comprises: means for generating n connectivity rings from the first order address lists, wherein n is a positive integer, and wherein the generating means generates each of the connectivity rings by considering a present numbered connectivity ring having parent nodes, and including in a next higher-numbered connectivity ring those nodes representing all children of the parent nodes that satisfy the following rules: no descendant of a parent can represent the same unit as is represented by the parent; no descendant of a child of the parent can represent the same unit as any of the children of the parent; and no child of any parent can have the same name as any other child of said any parent.

In yet another aspect of the invention, a wireless unit, for use in a wireless network having a scatter topology, comprises means for receiving address and topology information from each of a number of other wireless units; and means for generating a configuration tree from the address and topology information.

In still another aspect of the invention, the wireless unit further comprises means for utilizing the configuration tree to determine a route for a connection between the wireless unit and at least one of the other wireless units.

In yet another aspect of the inventive wireless unit, the address and topology information comprises an own address from each of the other units and only first order address lists from each of the other units; and the means for generating the configuration tree from the address and topology information comprises: means for generating n connectivity rings from the first order address lists, wherein n is a positive integer, and wherein the generating means generates each of the connectivity rings in accordance with a rule that a higher-numbered connectivity ring cannot include nodes representing units that are already represented by a node in a lower-numbered connectivity ring.

In still another aspect of the inventive wireless unit, the address and topology information comprises an own address from each of the other units and only first order address lists from each of the other units; and the means for generating the configuration tree from the address and topology information comprises: means for generating n connectivity rings from the first order address lists, wherein n is a positive integer, and wherein the generating means generates each of the connectivity rings by considering a present numbered connectivity ring having parent nodes, and including in a next higher-numbered connectivity ring those nodes representing all children of the parent nodes that satisfy the following rules: no descendant of a parent can represent the same unit as is represented by the parent; no descendant of a child of the parent can represent the same unit as any of the children of the parent; and no child of any parent can have the same name as any other child of said any parent.

In another aspect of the invention, a method for generating a connectivity tree for use in determining a connection route between a first wireless unit and any of a number of other wireless units comprises the steps of: in the first wireless unit, receiving address and topology information from each of the other wireless units, wherein the address and topology information comprises an own address from each of the other wireless units and only first order address lists from each of the other wireless units; and in the first wireless unit, generating n connectivity rings from the first order address lists, wherein n is a positive integer, and wherein each of the connectivity rings is generated in accordance with a rule that a higher-numbered connectivity ring cannot include nodes representing units that are already represented by a node in a lower-numbered connectivity ring.

Another aspect of the invention relates to a method for generating a connectivity tree for use in determining a connection route between a first wireless unit and any of a number of other wireless units. The method comprises the steps of: in the first wireless unit, receiving address and topology information from each of the other wireless units, wherein the address and topology information comprises an own address from each of the other wireless units and only first order address lists from each of the other wireless units; and in the first wireless unit, generating n connectivity rings from the first order address lists, wherein n is a positive integer, and wherein each of the connectivity rings is generated by considering a present numbered connectivity ring having parent nodes, and including in a next higher-numbered connectivity ring those nodes representing all children of the parent nodes that satisfy the following rules: no descendant of a parent can represent the same unit as is represented by the parent; no descendant of a child of the parent can represent the same unit as any of the children of the parent; and no child of any parent can have the same name as any other child of said any parent.

In another aspect of the invention, a wireless network having a scatter topology comprises: a first master unit; a second master unit; a first slave unit; and a second slave unit. The first master unit comprises: means for sending a first master address to the first slave unit; means for sending a first master clock to the first slave unit; and means for communicating with the first slave unit by means of a first virtual frequency hopping channel. The first slave unit comprises: means for receiving the first master address from the first master unit; means for receiving the first master clock from the first master unit; and means for communicating with the first master unit by means of the first virtual frequency hopping channel. The second master unit comprises: means for sending a second master address to the second slave unit; means for sending a second master clock to the second slave unit; and means for communicating with the second slave unit by means of a second virtual frequency hopping channel. The second slave unit comprises: means for receiving the second master address from the second master unit; means for receiving the second master clock from the second master unit; and means for communicating with the second master unit by means of the first virtual frequency hopping channel. Furthermore, in the wireless network a first hopping sequence of the first virtual frequency hopping channel is a function of the first master address; a phase of the first hopping sequence is a function of the first master clock; a second hopping sequence of the second virtual frequency hopping channel is a function of the second master address; a phase of the second sequence is a function of the second master clock; the first master clock is uncoordinated with the second master clock; and the first virtual frequency hopping channel uses the same radio spectrum as the second virtual frequency hopping channel. With this arrangement, the first virtual frequency hopping channel is different from the second virtual frequency hopping channel, thereby permitting communication between the first master unit and the first slave unit to take place without substantially interfering with communication between the second master unit and the second slave unit.

In still another aspect of the invention, each of the first and second master units in the wireless network further comprises means for transmitting an inquiry message that solicits a slave address from the first and second slave units.

Furthermore, each of the first and second slave units in the wireless network further comprises: means for receiving the inquiry message; and means, responsive to the inquiry message, for transmitting the slave address to the first and second master units.

In yet another aspect of the invention, each of the first and second master units in the wireless network further comprises: means for receiving slave address and topology information from more than one slave unit; and means for generating a configuration tree from the address and topology information.

In still another aspect of the invention, each of the first and second master units in the wireless network further includes means for utilizing the configuration tree to determine a route for a connection between the first and second master unit and the respective first and second slave units.

In yet another aspect of the wireless network, the slave address and topology information comprises an own address from each of the more than one slave units and only first order address lists from each of the more than one slave units; and the means for generating the configuration tree from the address and topology information comprises: means for generating n connectivity rings from the first order address lists, wherein n is a positive integer, and wherein the generating means generates each of the connectivity rings in accordance with a rule that a higher-numbered connectivity ring cannot include nodes representing units that are already represented by a node in a lower-numbered connectivity ring.

In still another aspect of the invention, the slave address and topology information in the wireless network comprises an own address from each of the more than one slave units and only first order address lists from each of the more than one slave units. Furthermore, the means for generating the configuration tree from the address and topology information comprises: means for generating n connectivity rings from the first order address lists, wherein n is a positive integer, and wherein the generating means generates each of the connectivity rings by considering a present numbered connectivity ring having parent nodes, and including in a next higher-numbered connectivity ring those nodes representing all children of the parent nodes that satisfy the following rules: no descendant of a parent can represent the same unit as is represented by the parent; no descendant of a child of the parent can represent the same unit as any of the children of the parent; and no child of any parent can have the same name as any other child of said any parent.

BRIEF DESCRIPTION OF THE DRAWINGS

The objects and advantages of the invention will be understood by reading the following detailed description in conjunction with the drawings in which.

DETAILED DESCRIPTION

Figure 1:
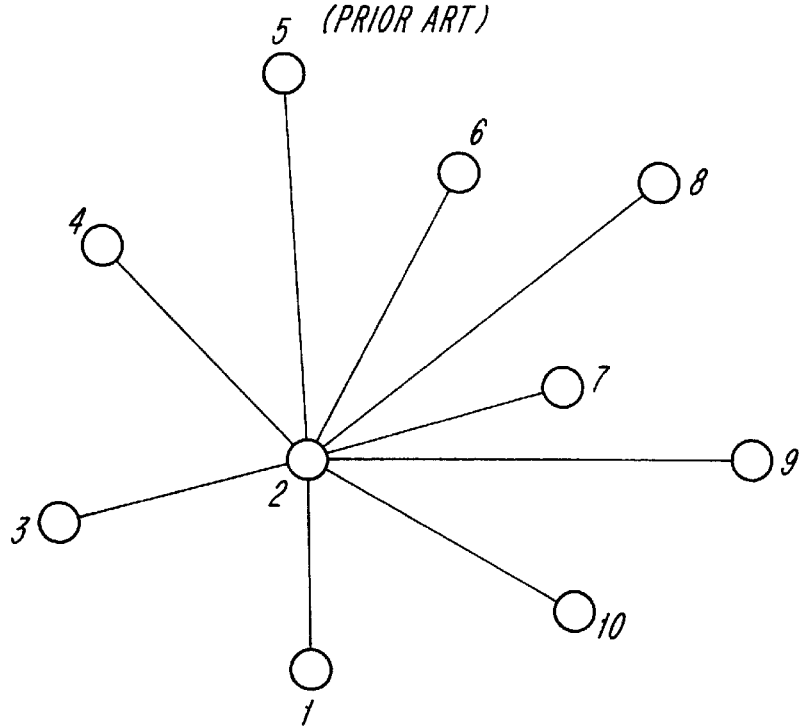
FIG. 1 is a block diagram of a network having a star topology.

The various features of the invention will now be described with respect to the figures, in which like parts are identified with the same reference characters.

Figure 2:
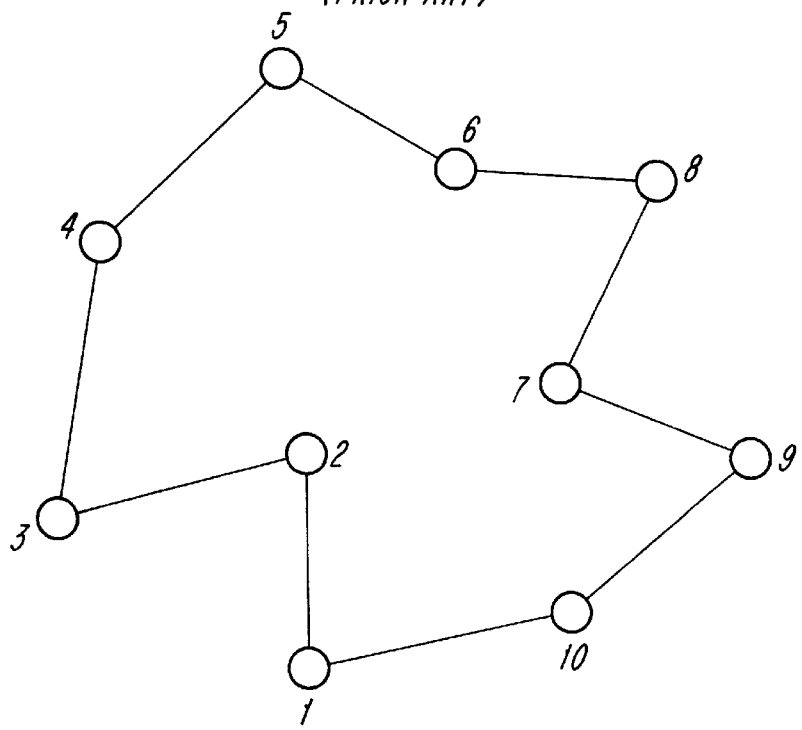
FIG. 2 is a block diagram of a network having a ring topology.
Figure 3:
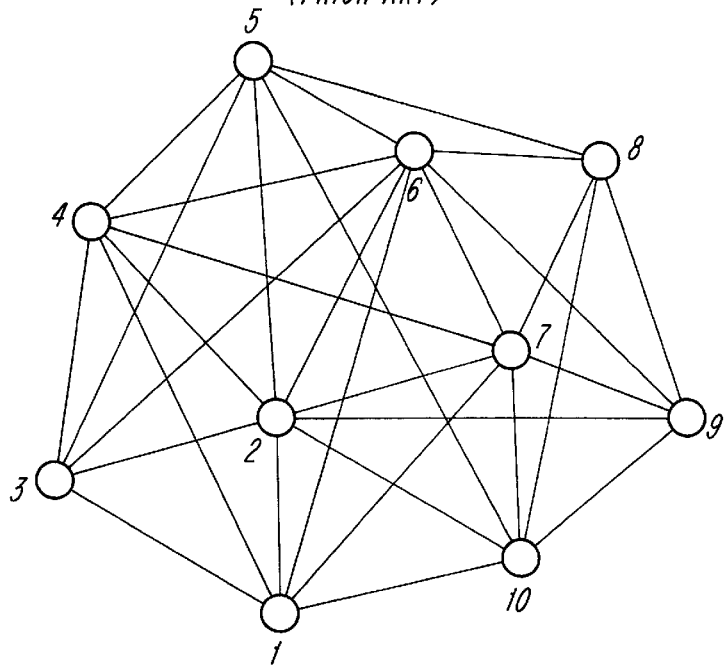
FIG. 3 is a block diagram of a network having a mesh topology.

As mentioned in the BACKGROUND section, the conventional single-channel approach to LANS is characterized by the fact that all units can receive all information transferred over the channel. Consequently, the network topology is either a star, as illustrated in FIG. 1; a ring, as illustrated in FIG. 2; or a mesh, as illustrated in FIG. 3. In the star topology, a master controller that schedules all communications can be placed in the center. In the ring and mesh topologies, a more distributed control is applied. For wired LANs, the star and the ring topologies are most appropriate, because they minimize the amount of cabling. However, the mesh topology (i.e., a topology in which one unit can connect directly to many other units) is automatically obtained in radio LANs due to the omni-directional radio propagation. In the conventional topologies illustrated in FIGS. 1, 2 and 3, all units connect to each of the other units in the network. Each unit constantly listens to the master or listens to traffic on the channel. This is beneficial in applications like broadcasting or multicasting. However, these applications are only used a small percentage of the time. Instead, most applications call for point-to-point or point-to-multipoint services between two or a limited number of units connected to the network. For these applications, the single-channel approach limits the performance.

Therefore, in accordance with one aspect of the invention, a multi-channel approach is applied in which units that want to communicate don't have to wait for a free spot on the channel, but instead look for a free channel which they can use directly. In this approach, all users share all of the channels in the allocated spectrum on average, but only a few users use a particular channel at a particular moment in time. In this way, simultaneous communication links can be established without interfering with each other. The multi-channel approach also enables channel reuse: if the connections are sufficiently separated geographically, they can use the same channel without disturbing one another.

In a network like this, only units that communicate with each other are connected. The "overall" network consists of scattered connections or scattered subnets (piconets) and is therefore referred to herein as having a scatter topology. This arrangement differs from the existing wired LANs and wireless LANs in that although the medium (e.g., the 83.5 MHz radio spectrum at 2.4 GHz) is shared among all users, the information transferred over the medium is not shared among all users. Instead, multiple, channels are created, and each channel is only shared by the participants of interest, namely, only those participants that need to share the information. Although each unit can potentially connect to each other unit in range, it will not instantaneously connect to all units in range simultaneously. Multiple ad-hoc connections can be established, which each operate independently.

Figure 4:
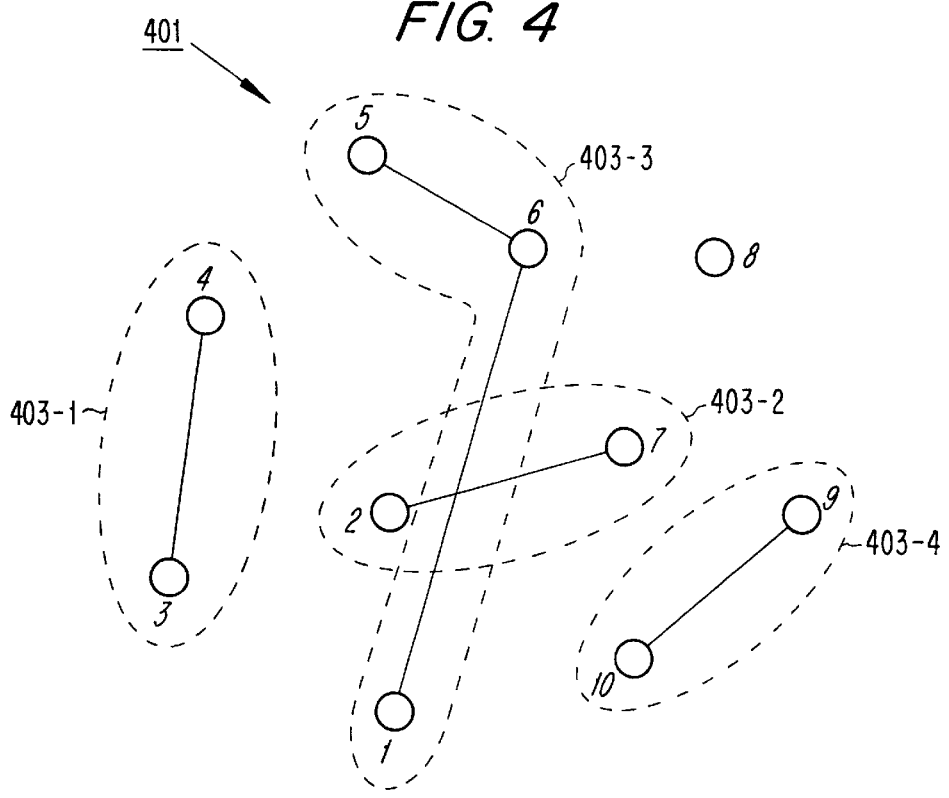
FIG. 4 illustrates a wireless LAN having a scatter topology, in accordance with one aspect of the invention.

An example of a scatter network 401 in accordance with the invention is illustrated in FIG. 4. In this figure, four subnets 403-1, . . . , 403-4 have been formed. In each subnet 403-x, only those units participate that indeed want to exchange information. Each subnet 403-x has its own virtual channel, and only the participants of the piconet contend for the corresponding channel. The subnets 403-x function independently with respect to one another. Units for which there is no need for information exchange (such as unit 8 in FIG. 4) are not connected. However, these units periodically scan the spectrum for page messages to see whether another unit wants to connect to them.

To avoid interference between different connections and subnets 403-x, either a form of adaptive channel allocation or a form of spreading is applied. When adaptive channel allocation is applied, the units that want to connect perform measurements on the different channels and then select the best channel (i.e., the least-interfered-with channel). The adaptive scheme, however, has some disadvantages compared to the spreading techniques described next. First, it may be difficult to obtain reliable measurements on a channel due to the bursty nature of the data traffic. Second, a mechanism must be included such that the units that want to communicate indeed select the same (least interfered with) best channel, which is not a trivial task. A central controller is unavoidable. Instead spreading, as is also required by the Federal Communication Commission (FCC) in the unlicensed band like the ISM 2.4 GHz, is a much more attractive method.

For the case in which spreading is utilized, direct-sequence spreading or frequency-hop (FH) spreading can be applied to spread the interference. A suitable air interface applying slow FH is described in U.S. patent application Ser. No. 08/685,069 (Attorney Docket No. 27951/00059 EUS00390-RCUR), entitled "Short-Range Radio Communications System and Method of Use", which was filed on Jul. 23, 1996 in the name of Paul W. DENT and Jacobus C. HAARTSEN, which is commonly assigned to the same assignee as that of the present application, and which is hereby incorporated herein by reference. In the just-referenced application, an air interface is described that obtains immunity against co-user interference and other jammers by applying frequency hopping and a fast packet-retransmission scheme.

Frequency hopping is preferred over direct-sequence spreading for a number of reasons. First, it is desired to be able to make multiple, co-located but uncoordinated ad-hoc connections. In this environment, direct-sequence spreading would pose near-far problems. A power control mechanism cannot be implemented because of the uncoordinated nature of the transmitters. The existence of unknown jammers would also mandate the need for a rather high processing gain and high transmission (TX) power. The high spreading rate that the high processing gain would involve, would result in a costly transceiver design. As to high TX power, this is less attractive in battery-driven user equipment. Finally, the best interference immunity is obtained by using the entire spectrum available, that is 83.5 MHz at 2.4 GHz. Direct-sequence spreading can only use part of the spectrum due to bandwidth limitations in the transceiver. Instead, frequency hopping systems can hop over the entire spectrum on average, but still have a reasonable channel bandwidth instantaneously. Analogous to the IEEE 802.11 standard, the present invention defines 79 hops of 1 MHz width. A virtual channel is defined as a pseudo-random hop sequence which hops on average over all 79 hops. Different connections can be established simultaneously by applying different virtual channels. Occasionally, different virtual channels will use the same hop, in which case they collide. Error recovery and redundancy are then used to overcome the disturbance.

Figure 5A:
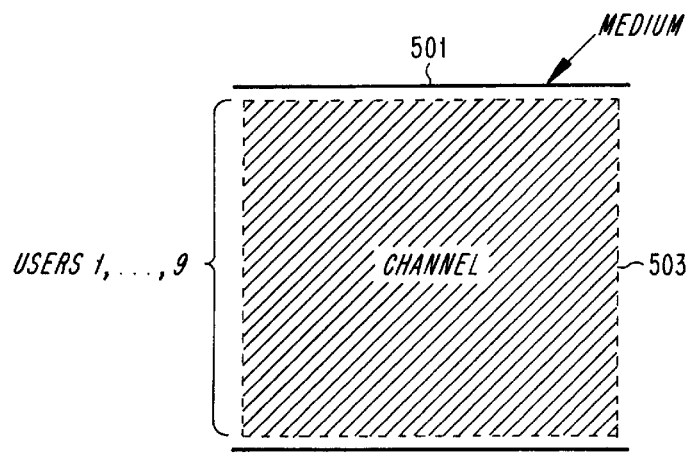
FIG. 5a depicts a prior art LAN that utilizes a single channel that is identical to the medium.
Figure 5B:
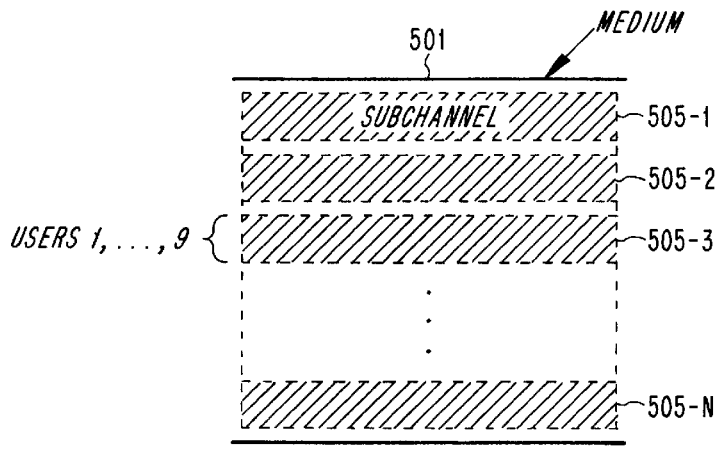
FIG. 5b depicts a prior art LAN in which the medium is divided into several subchannels.
Figure 5C:
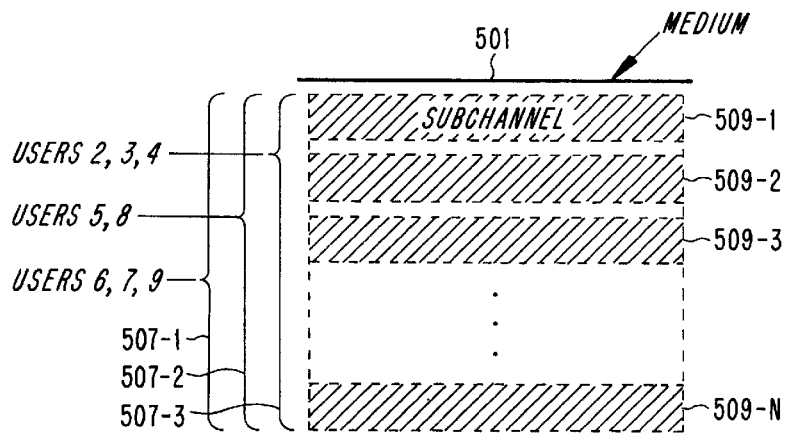
FIG. 5c illustrates a LAN that utilizes a multi-channel approach in accordance with one aspect of the invention.

The sharing of the medium in accordance with the present invention compared with other systems is further explained in FIGS. 5a, 5b and 5c. FIG. 5a shows a prior art single channel approach in which there is only one channel 503, and this channel 503 is identical to the medium 501, as is typically encountered in wired LANS. All users contend for the same channel 503, and TDM is utilized to give each user a portion of the transmission capacity. Access to the channel 503 is controlled either centrally or in a distributed manner. In FIG. 5b, a prior art system is shown in which the medium 501 is divided into several subchannels 505-x, for example by applying Frequency Division Multiplexing (FDM). The users in range establish a network using one of those subchannels 505-x. This subchannel 505-x is either fixed (like in HIPERLAN) or hops slowly through the entire medium (like in IEEE 802.11 FHSS). That is, at different points in time, a different subchannel 505-x is selected. However, at any point in time, all users contend to gain access to the same subchannel. For example, in the illustration of FIG. 5b, a moment in time is shown in which each of the users 1 through 9 contends to gain access to subchannel 505-3.

In FIG. 5c, the multi-channel approach of the invention is shown. Again, the medium 501 has been divided into subchannels. However, a group of connected users 507-x is multiplexed (i.e. is frequency hopping) through all subchannels 509-x at a relatively high rate. Packets are multiplexed at the hop rate among the different subchannels 509-x. The hopping pattern represents a virtual channel. In FIG. 5c, three user groups 507-x are presumed: a first group 507-1 comprising users identified as users 2, 3 and 4; a second group 507-2 comprising users identified as users 5 and 8; and a third group 507-3 comprising users identified as users 6, 7 and 9. In accordance with the invention, each of these groups 507-x constitutes a piconet. In this example, an additional user, user 1, is not in any of the user groups 507-x, and is therefore not connected in any of the three piconets.

It will be understood that the multi-channel approach in FIG. 5c gives a much higher overall throughput than the single-channel approach in FIG. 5b when the medium has to be divided into a plurality of smaller subchannels due to radio transceiver limitations or regulations. In the present invention, each piconet corresponds to a virtual channel using a particular sequence to multiplex (hop) through the subchannels, and using a particular link address to identify its packets. The different piconets reuse all the subchannels in a random way; each subchannel is used on average by all piconets. The sharing of the subchannels results in a statistical multiplexing between the piconets which increases the efficiency under bursty traffic conditions such as those encountered in data applications. Due to the fast hop rate (one packet per hop), the statistical multiplexing is much more efficient than, for example, can be obtained in co-located WLANs based on a FHSS 802.11 where the dwell time on a single channel is much longer.

The type of service obtained with a multi-channel approach lies somewhere between a pure circuit-switched service and a pure packet-switched service. Virtual channels are defined similar to channels in connection-oriented packet-switched networks. However, each virtual channel is uniquely coupled to two or more users and operates in a synchronous manner similar to channels in circuit-switched networks. Furthermore, unlike the (sub)channels or circuits in circuit-switched networks which are used exclusively by the connected users, the circuits in the piconets are shared on average among all the users. For bursty data applications this provides higher throughput and better usage of the medium due to the statistical packet multiplexing which is not encountered in conventional circuit-switched networks.

The discussion will now focus on exemplary techniques for enabling units to establish the ad hoc piconet connections described above. The system described here has been optimized to quickly establish and end ad-hoc connections between arbitrary wireless units scattered in a restricted area. Both point-to-point and point-to-multipoint connections can be set up. All units are peer units, each utilizing identical radio transceiver equipment. In accordance with one aspect of the invention, one unit is temporarily assigned the role of master whenever a connection is started. This assignment lasts only for the duration of the connection. Unless redefined, the master unit is the unit that initiates the connection. Each unit has a unique address, or access code, by which it is identified. In an exemplary embodiment, the address is 64-bits long, but of course, this need not be the case in every embodiment. The address determines the pseudo-random hop sequence or virtual channel that the unit uses when it is a master. The master, therefore, has to distribute its address among the slaves so that all use the same virtual hopping channel. During a connection, a very long hop sequence is used in which each hop in the 79 possible hops is visited with equal probability. The phase in the hop sequence is determined by the system clock in the master transceiver unit.

A unit in standby mode wakes up at regular time intervals, say every T seconds (such as every 1.28 s), to listen for a page message which consists of its address. This page message can be considered like a 64-chip direct-sequence code: the receiver correlates against this code and only then activates the rest of the transceiver if the correlation result exceeds a certain threshold. Each new wake-up instant, the unit wakes up at a new hop according to a 32-hop wake-up sequence. The 32 wake-up hops are all unique and evenly spread over the 2.4 GHz ISM band. Both the wake-up hops and the pseudo-random wake-up hop sequence are determined by the standby unit's address. The phase in the sequence is determined by the system clock of standby unit. The unit trying to connect (the "paging unit") retransmits the page message (which is the spreading code representing the recipient's address) with a high repetition rate in different hops. It uses the wake-up hops and the wake-up hop sequence of the recipient, and tries to reach the recipient by sending the page message at as many different hops in the wake-up hop sequence as possible. By having an estimate of the recipient system clock, the paging unit can expedite the acquisition because it knows when and in which hop the recipient will wake up. With knowledge about the recipient's clock, the worst-case acquisition delay is T (due to the fact that a standby unit only wakes up once every T seconds). Without knowledge of the standby unit's clock, the worst-case acquisition delay amounts to 2T. These delays are obtained in an error-free environment. If errors occur, the acquisition time may increase. The above-described techniques for accessing a unit that is in standby mode are more fully described in U.S. patent application Ser. No. 08/771,692, entitled "Access Technique of Channel Hopping Communications System" and filed on Dec. 23, 1996 in the name of Haartsen et al. The U.S. patent application Ser. No. 08/771,692 is hereby incorporated herein by reference.

Once a connection has been established, the paging unit, which is designated as the master unit, conveys its address and its system clock to the recipient. The master code and clock will then be used to define the virtual FH channel. This master code is also used to identify the packets on the virtual channel. That is, each packet on the virtual channel, irrespective of which user of the virtual channel is the sender, is preceded by the master address, which acts as a link address. When different units in the same area establish different connections, they each use a different virtual channel and different link address as defined by the parameters of the units that initiated the connections (i.e, the master units).

In order to allow more than two users to participate in a piconet, limited point-to-multipoint capabilities are defined in an exemplary embodiment which permit a unit assigned as master to connect to a plurality of slaves. A star topology results with the master in the center. Slaves cannot communicate directly with each other, but need to use the master as an intermediary. A polling scheme is utilized that schedules the transmissions of the different slaves. All slaves are time synchronized, that is, they all listen to the master at the same time. only the slave that is addressed (read polled) in the slave receive (RX) slot is allowed to respond in the succeeding slave TX slot. All units, master and slaves, recognize the packets on the virtual channel by the link code (which is the master address). A particular slave in the piconet is identified by a member address. In an exemplary embodiment, the member address is a 3-bit address in the packet header. The 3-bit address limits the number of participants in a piconet to eight. If a particular embodiment does not permit the packet header to be enlarged to include a wider address field, then a larger number of participants could be allowed by implementing a further addressing scheme in the payload of the packet.

The link between units uses a Time Division Duplex (TDD) scheme in which a radio transceiver alternately transmits and receives. A TDD frame consists of a transmit slot and a receive slot. The messages to be transmitted are divided into packets. Each TX and RX slot can contain at most one TX packet and one RX packet, respectively. Consecutive slots use different hops as defined by the virtual channel. The virtual channel provides a synchronous link: units that share the same virtual channel hop in synchrony and strictly adhere to the TDD timing. However, a slot does not have to be occupied. If there is no data to be sent, two connected units can hop in synchrony without exchanging packets. Although the service provided by this link is by its nature connection-oriented, each packet contains the link address corresponding to the virtual channel. The channel is not contention-free. Rather, different virtual channels may occasionally use the same hop. Consequently, a recipient needs to examine the received link address in order to identify whether the received packet is really his, or whether the packet is associated with another virtual channel that, by accident, landed on the same receive hop as the one for the recipient's virtual channel. The usage of the link address is quite important because bursty traffic may result in empty slots that may accidentally be filled by other links, and because near-far situations may occur in which an interfering packet completely wipes out the intended packet.

Voice transmission is not a problem in this system because a synchronous link is provided. If voice is part of the information stream, a voice packet will be transmitted every TDD frame. Occasional collisions may be overcome by recovery techniques at the recipient, or alternatively they may be ignored. The latter requires that robust voice coding techniques like Continuous Variable Slope Delta (CVSD) modulation be applied.

An Automatic Retransmission Query (ARQ) scheme is applied in which the success or failure of a packet in the TDD frame is directly informed in the succeeding TDD frame. In this way, minimal spectrum is wasted in the ARQ Protocol: only failed packets are retransmitted. In addition, both latency and overhead are minimized (in the exemplary embodiment, the ARQ scheme only requires two bits in the packet header). The implementation of the ARQ scheme can be done directly in hardware and is preferably located very close to the physical layer in the communications protocol.

The star topology and polling access scheme of the present invention are a consequence of the piconet definition and the strict timing synchronization in the virtual channel. If two slaves need to communicate directly with one another, an additional piconet is then created over which the original master has no direct control. One of the slaves shifts its TDD framing by half a frame. This slave cannot hear the master anymore (it acts like a master of the new piconet), and neither can the original master hear the slave. Although for a piconet, a single (virtual) channel approach is used, distributed control is not possible because of the strict timing synchronization applied.

To be able to connect to a unit, it is essential that its address be known. In conventional LANs (including conventional wireless LANs), these addresses are usually known to all participants of the LAN. Because all units are already connected with each other, the units can simply establish links by using the proper addresses when sending a message. No connection needs to be established. The unit that recognizes its address simply takes the message, while all other units discard the message.

Because the scatter network is established on an ad hoc basis, the units do not have prior knowledge of all addresses of neighboring units. To solve this problem, and in accordance with another aspect of the invention, an inquiry procedure is provided that enables units to learn of the addresses of nearby units. The inquiry procedure is very similar to the page procedure. Instead of a page message, an inquiry message is transmitted with a high repetition rate in different hops. In the exemplary embodiment, the inquiry message is a 64-bit code ordering the recipient to reveal its unit parameters. Like the address, the inquiry code determines, for example, 32 different inquiry hops and an inquiry hop sequence. Units that receive an inquiry message respond with a single packet including the recipient's address, the recipient's system clock, and its class of service (e.g., whether the unit is a printer, a laptop computer, a base station, and the like). Units may randomly choose a return hop in the inquiry hop sequence to avoid collisions. The inquiring unit collects all responses, and makes a list of codes and clock offsets of the units that are within range. The information can then later be used when a connection is desired. Since units are moving, the inquiry procedure may be repeated periodically so that the list can be updated when necessary.

Figure 6A:
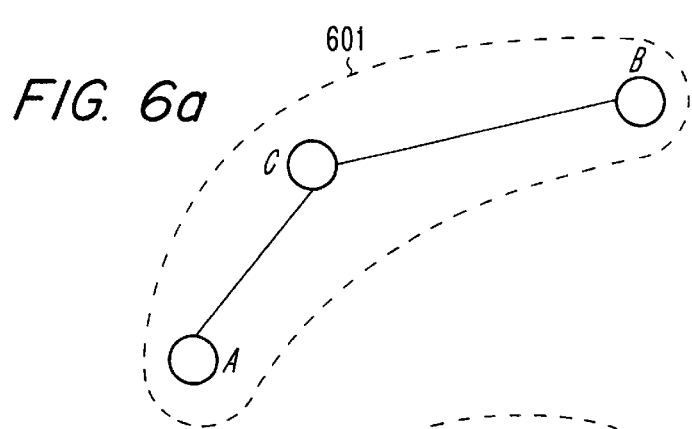
FIG. 6a depicts a piconet in accordance with one aspect of the invention in which two wireless units that are not within range of one another communicate by means of an intermediate wireless unit that is within range of each of the other wireless units, and which acts as a master of the piconet.

The above-described process enables a unit to collect all of the information necessary for it to establish a piconet with units that are within range. However, in some instances a unit may want to connect to a unit that is out of range (i.e., too far away for direct radio communication to take place between the units). In accordance with another aspect of the invention, this problem is solved by utilizing an intermediate unit that is within range of both the source unit and the destination unit. In one embodiment, the intermediate unit acts like a master in a point-to-multipoint configuration, and relays information between the two units that cannot connect directly. This embodiment is illustrated in FIG. 6a, in which two units A and B are out of range. A third unit, unit C, is in range of both units A and B, and is used as a master. Units A and B are slaves in this single piconet 601.

Figure 6B:
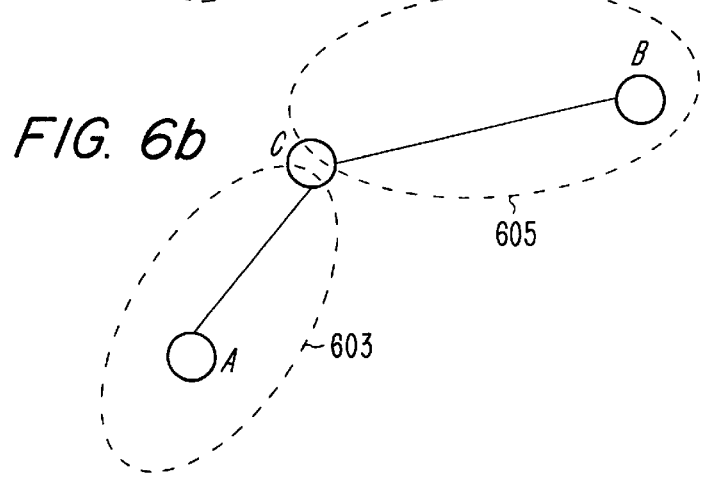
FIG. 6b depicts an alternative embodiment of the invention in which two wireless units that are not within range of one another communicate by means of an intermediate wireless unit that is within range of each of the other wireless units, and which acts as a bridge between two piconets.

In an alternative embodiment, illustrated in FIG. 6b, the intermediate unit that is within range of the two other units acts as a bridge between the source and destination units. A bridge unit is a more complicated unit that is able to connect to two piconets. As illustrated in FIG. 6b, units A and B, which are out of range with respect to one another, participate in different piconets 603 and 605. The bridge unit C participates in each of these piconets 603 and 605. Because the two piconets 603 and 605 are uncoordinated, the bridge unit C essentially comprises two transceiver units, each participating in a different one of the piconet 603 and 605. Within the bridge unit C, information is transferred back and forth between the two transceivers. Because the bridge C uses two virtual channels (two piconets) instead of one, it provides a higher throughput between the units A and B than the point-to-multipoint configuration of FIG. 6a.

In order to permit bridge configurations to be established in a system, a more extensive inquiry process is needed to enable each unit to learn the addresses of not only those units that are within range, but also the addresses of those out-of-range units that are within range of accessible bridge units. This more extensive inquiry process will be described in greater detail below. For the moment, though, it is further noted that if a connection is required to a unit that is out of range, the source unit first establishes a connection to the master or bridge unit that is in range of the source unit. Once a connection is established, the source unit orders the master or bridge to make a further connection to the next bridge or to the final destination. Once a master or bridge unit has made the two connections, it merely relays all incoming user information. Control information, however, is dealt with separately.

The use of intermediate units to set up connections depends of course on the geographical distances and the range of a single unit. The range of the unit's radio may be limited because this results in a cost-effective implementation and low power consumption. Higher power levels would result in an increased range and would simplify connectivity in the wireless LAN. However, it should be noted that power levels also affect the capacity of the system as a whole. When low power levels are utilized, the limited range means that piconets that are separated by a sufficient geographical distance will not interfere with each other at all because the interference power will be lower than the receiver sensitivity level.

Returning now to the inquiry process by which units learn of the addresses of other units with which they can communicate, two problems are presented if bridge unit capability is to be supported:
1) If the destination is out of range, how can a source unit know of its existence?
2) How is the address of the destination unit obtained if this cannot be obtained as a direct result of the source unit's inquiry process?

To solve both problems, the amount of information exchanged during an inquiry is increased beyond that which was described above. That is, in addition to a unit's own address and its class of service, a unit receiving an inquiry message also provides the inquiring unit with all addresses and classes of service of the units the inquired unit can reach. This information will have been collected in the inquired unit in a previous inquiry procedure carried out by the inquired unit. In this way, not only are the units in range of the inquiring unit determined, but also the units in range of these inquired units are determined. The source unit can then connect to a destination unit that is out of range via intermediate bridge units whose addresses can be derived. This procedure can be repeated, in that an inquired unit not only provides its own address list, but also the address lists it received from other units which they obtained during their own inquiry sessions. In this way, a unit can collect all lists identifying all units in the area that have the possibility of connecting to each other, either directly or indirectly (e.g., via bridge units). From the lists, the source unit can classify the units according to "connectivity" rings. The units belonging to the first connectivity ring can be reached directly by the source unit. Units belonging to the second connectivity ring can only be reached by the considered units via a bridge (or other intermediary) unit in the first connectivity ring. Units in the third connectivity ring can only be reached by applying two bridge units, one in the first connectivity ring, and one in the second connectivity ring (which is in the first connectivity ring of the first bridge unit).

To connect to a destination unit, a source unit investigates the address lists with connectivity rings, and uses a tree tracking algorithm to determine which units will be used as bridge units. A connection to the destination is then established by subsequently making a connection first from the source unit to the first bridge unit, then from the first bridge unit to the second bridge unit, and so on, until the last bridge unit connects to the destination unit.

The inquiry procedure will now be illustrated in connection with the exemplary configuration shown in FIG. 7. The peer units 1, . . . , 10 are shown in a local area. Each unit is indicated by a node and number. Potential connections can be established between certain units, as shown by the dashed lines. It can be seen in this example that not all units can directly reach each other, for example, unit 9 is in the coverage area of, and can therefore connect to, units 2, 8 and 10, but cannot reach the other units 1, 3, 4, 5, 6 and 7. This may be caused by additional propagation losses (radio shadowing) or other conditions that block a possible radio connection.

When broadcasting an inquiry, unit 9 will get a response from units 2, 8 and 10, which will reveal their addresses and classes of service. The "first-order" address list in unit 9 is thus {2, 8, 10}. These are the addresses of the units in the first connectivity ring of unit 9. (Of course, unit 9 also retains lists of other information, such as classes of service, in connection with the nearby units. For the sake of simplicity, all of this information will henceforth be referred to generally as addresses.) In addition to their own address, each unit 2, 8, and 10 gives unit 9 its respective first-order address list. These lists will, of course, include the address of unit 9 if unit 9 has been in the local area long enough to have received and responded to an inquiry from these other units. For example, unit 2 will give its first-order address list including 1, 3, 6, 7 and 9. With the address list received from units 2, 8 and 10, unit 9 can generate a second-order address list that includes all units in the first-order lists from the other units, not covered in the first-order address list of unit 9 and excluding unit 9 itself.

Comparing unit 2's first-order address list {1, 3, 6, 7, 9} and unit 9's first-order address list {2, 8, 10}, unit 9's second-order address list will at least include units 1, 3, 6 and 7. By using the first-order address lists of units 8 and 10 as well, the final second-order address list in unit 9 will read {1, 3, 6, 7}. It will be understood that this process can be extended to more remote units, that is, units can also give their second-order address lists to unit 9, which can then be used as the basis for generating a third-order address list, and so on.

Figure 8:
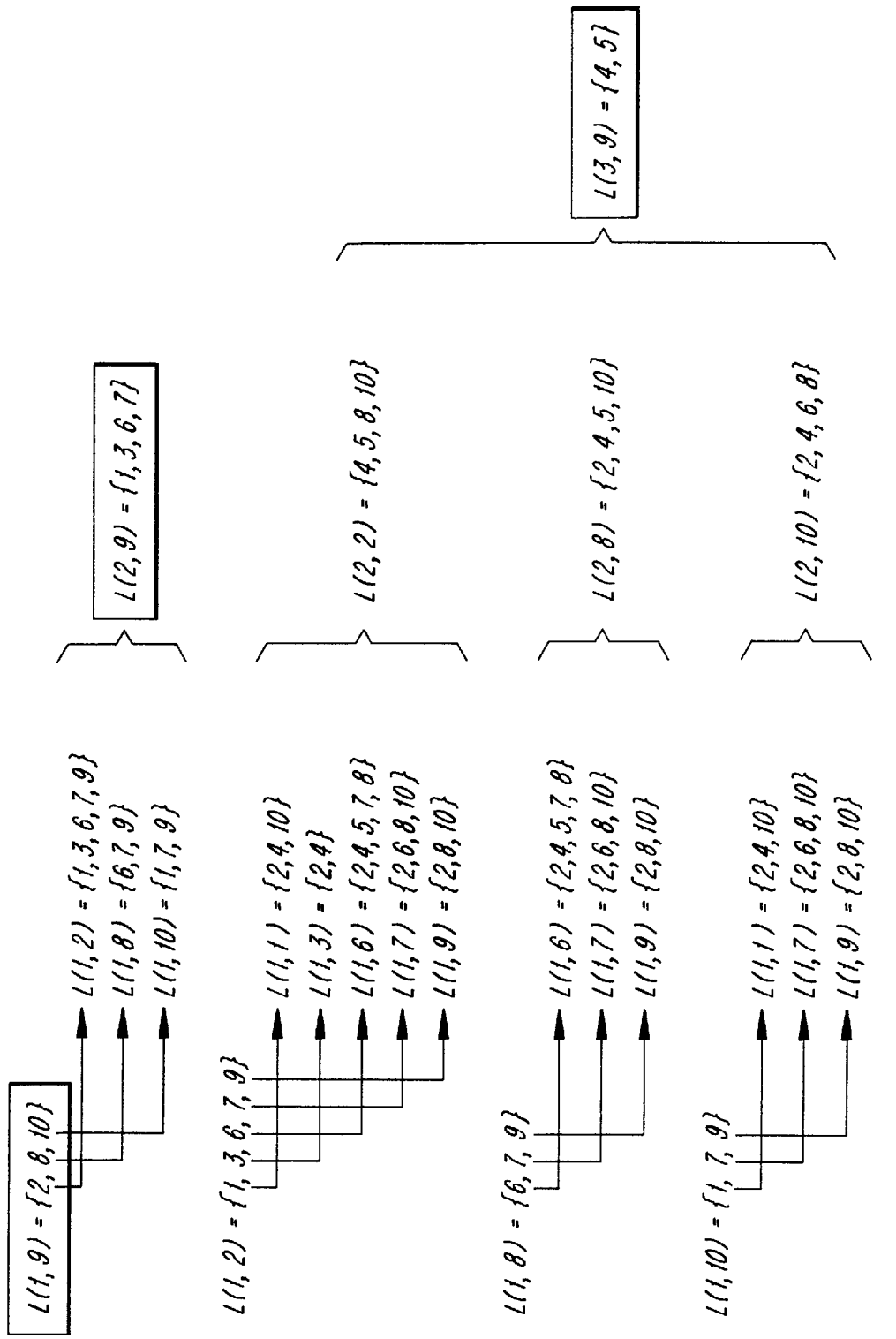
FIG. 8 depicts an extended inquiry process in accordance with another aspect of the invention.

This extended inquiry process is illustrated in FIG. 8, in which the i-th order address list of an arbitrary unit j is indicated as L(i,j). In FIG. 8, only the address lists necessary for unit 9 have been considered. Unit 9 has a first-order list of L(1,9)={2, 8, 10}. Units 2, 8 and 10 themselves have first-order lists L(1,2), L(1,8), L(1,10) as shown in the figure. The lists L(1,2), L(1,8), L(1,10) are supplied to unit 9 by the respective units 2, 8 and 10 in response to unit 9's inquiry. From these lists, unit 9 itself can form a second-order list L(2,9) by merging L(1,2), L(1,8) and L(1,10) and removing references to itself as well as references to any other units that are already included in its own first-order list, L(1,9). In this example, this results in the second-order list L(2,9)={1, 3, 6, 7}. The units identified in this list cannot be reached by unit 9 directly, but can be reached by the use of a single bridge unit. Thus, the units listed in L(2,9) form the second connectivity ring as seen from unit 9.

Figure 9:
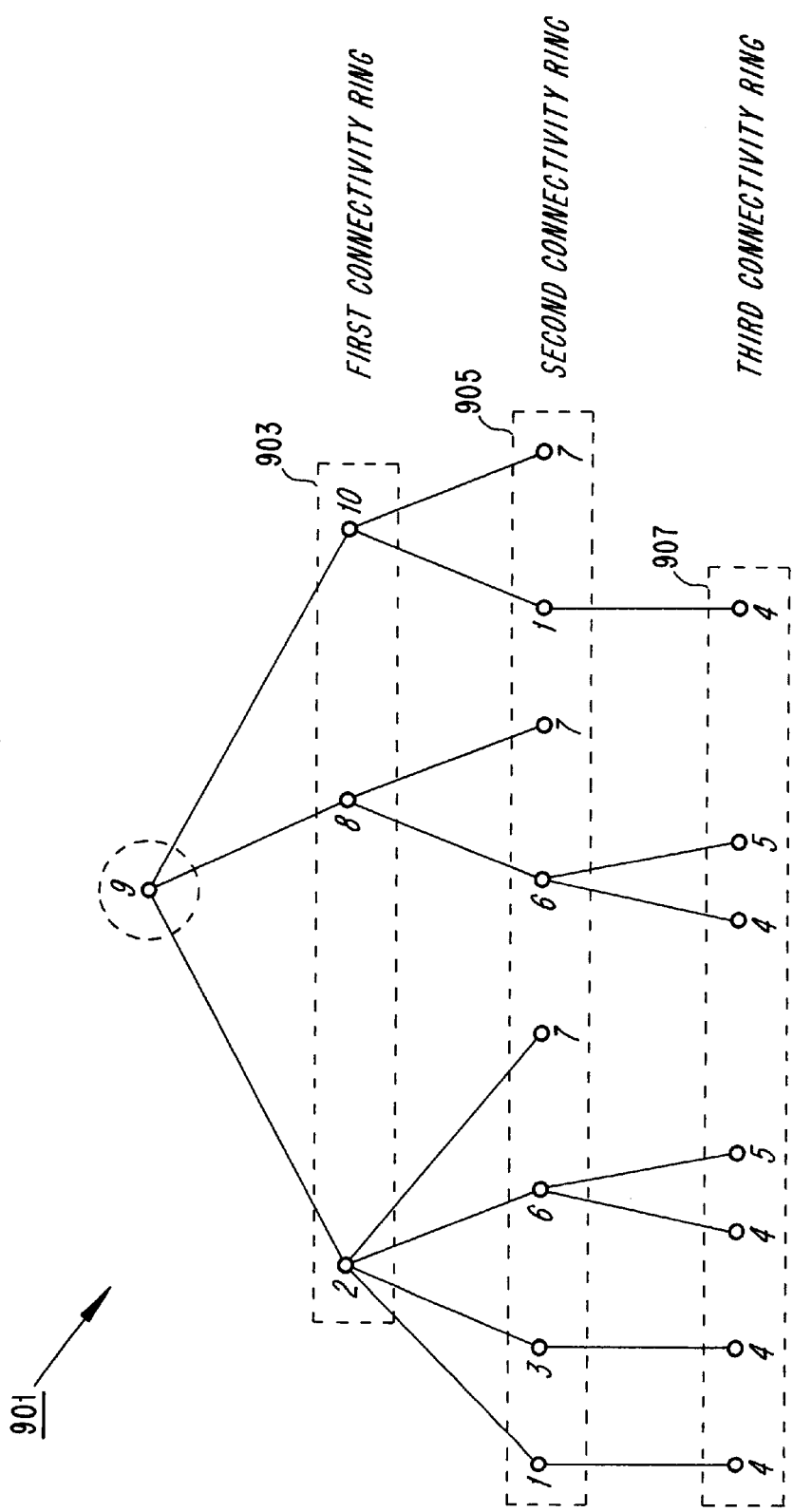
FIG. 9 depicts an exemplary first type of connectivity tree, in accordance with an aspect of the invention.

The above-described procedure can be extended still further because units 2, 8 and 10 can also derive their second-order lists (L(2,2), L(2,8) and L(2,10), respectively) and provide these lists to unit 9. After merging and filtering these lists, unit 9 can derive a third-order list L(3,9)={4, 5}. With the lists as shown in FIG. 8, a connectivity tree can be generated that includes the possible connections. The connectivity tree 901 for the exemplary unit 9 is shown in FIG. 9. Each node in the connectivity tree 901 represents a particular one of the units 1, . . . , 10., and a branch represents a possible connection. At the top of the connectivity tree 901 is the considered unit, which in this example is unit 9.

The connectivity tree can also be generated by merely considering all first-order address lists from all units, and following the rule that a higher-numbered connectivity ring cannot include units that have already been encountered in lower-numbered connectivity rings to exclude loops.

The above-described extended inquiry technique and the connectivity tree, such as the exemplary one shown in FIG. 9, enable each source unit to find the shortest route (using the minimum number of bridge units) to the destination unit. However, this technique does not take into account the fact that certain units may not be capable of operating as bridges, or may currently be busy leaving them without the radio resources necessary for relaying information between other units. Because they operate on battery power, it is usually preferable that portable devices not be used as bridge devices. Therefore, the source unit might not be able to use the shortest route. In that case, the above-described techniques provide too little information.

Figure 10:
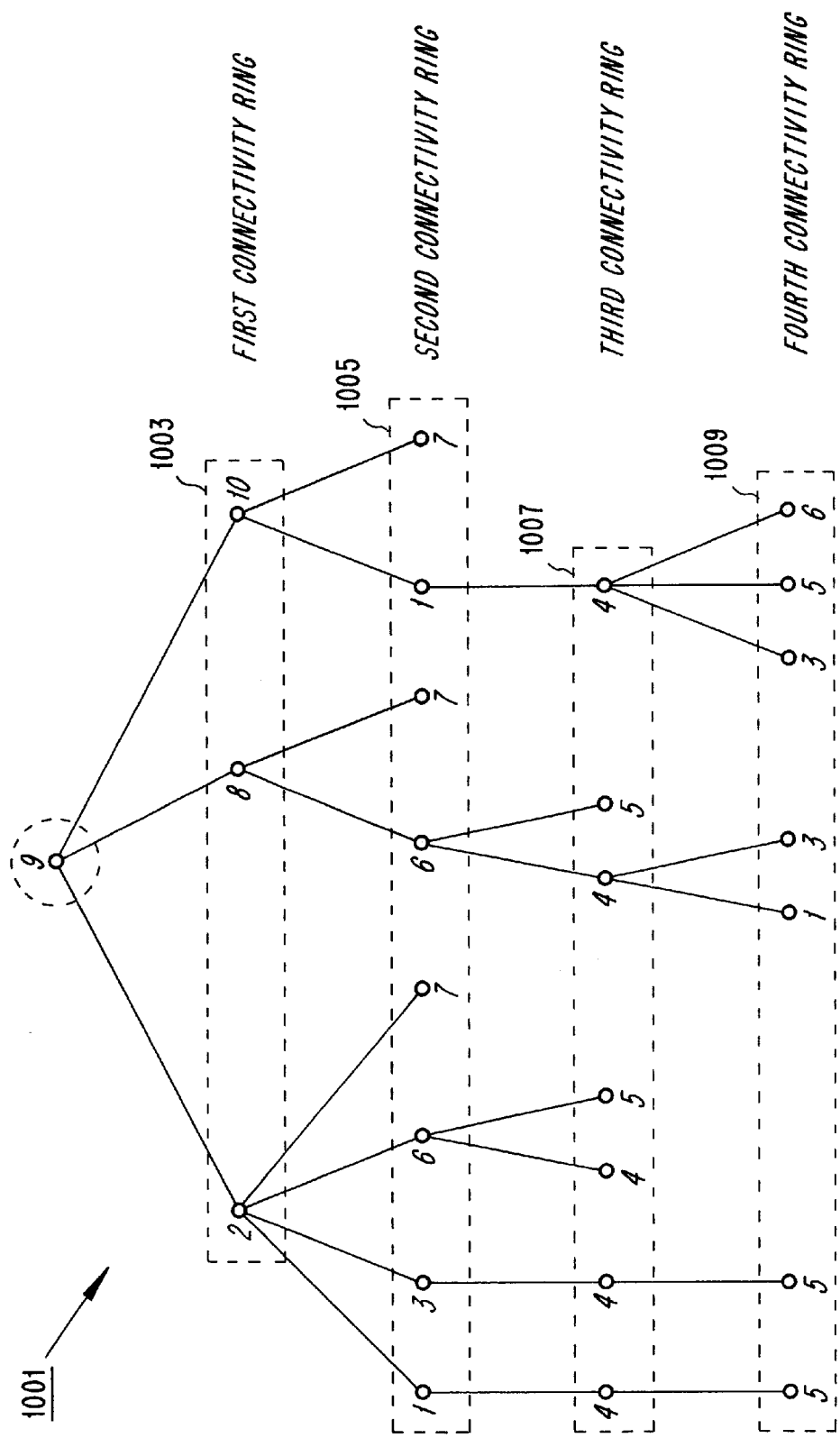
FIG. 10 depicts an exemplary second type of connectivity tree, in accordance with another aspect of the invention.

In order to address this problem, an alternative embodiment will now be described that makes use of another tree structure. Referring now to FIG. 10, unit 9 is able to utilize only first-order address lists to create a second connectivity tree 1001. As with the first connectivity tree 901, unit 9 is at the top of the connectivity tree 1001. There are three units that can be connected to unit 9 directly, namely, units 2, 8 and 10. These units 2, 8 and 10 constitute a first connectivity ring 1003. In this discussion, the relationship between a unit and the other units to which it can directly connect will be referred to as a parent-child relationship. Thus, for example, unit 9 is a parent whose children are the units 2, 8 and 10. These children, when considered as parents themselves, each have their own children, and so on.

Each parent knows its children by means of its first-order address list. To set up a connectivity tree such as the second connectivity tree 1001, it is only necessary to know first-order address lists. It is desired to reduce the size of the tree by removing all unnecessary nodes and branches. To accomplish this reduction, the following rules are applied:

1) Descendants (e.g., children, grandchildren, great-grandchildren, and so on) of a parent cannot have the same name (i.e., unit address) as that parent;
2) Descendants of a child of a parent cannot have the same name as any of the children of that parent; and
3) Any child of a parent cannot have the same name as any of the other children of that parent.

Figure 7:
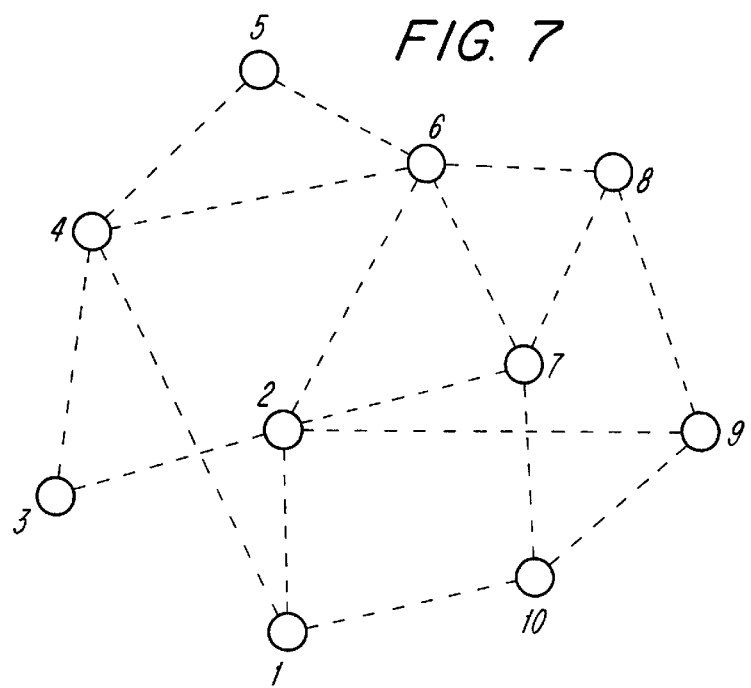
FIG. 7 depicts an exemplary configuration for illustrating the inquiry procedure in accordance with one aspect of the invention.

The second connectivity tree 1001 is a result of following this rule with respect to the exemplary units depicted in FIG. 7. For example, consider either occurrence of unit 5 in the third connectivity ring 1007. As can be seen from FIG. 7, unit 5's first-order connectivity list, $L(1,5)=\{4, 6\}$. However, if unit 5 were allowed to have a child unit 4 in the fourth connectivity ring 1009, this would violate the second rule, because unit 5, as a child of unit 6, also has a sibling (i.e, another child of unit 6) identified as unit 4.

Also, if unit 5 were allowed to have a child unit 6 in the fourth connectivity ring 1009, this would violate the first rule because this child unit 6 would have a grandparent (in the second connectivity ring 1005) that is also identified as unit 6.

Thus, the tree cannot be extended at any of the nodes representing unit 5 in the third connectivity ring 1007. However, there are also nodes representing unit 5 in the fourth connectivity ring 1009, because their placement did not violate any rules.

The tree is built from first-order connectivity lists and reduced according to the two rules set forth above until no new nodes can be added. At this point, the tree is finished, and all available connectivity information is present in the considered unit.

It will be understood that a second connectivity tree 1001 such as the one depicted in FIG. 10 can be generated in a considered unit (e.g., unit 9) as soon as that unit has received all first-order address lists. To facilitate the collection of this information, a unit that receives an inquiry preferably responds with not only its own first-order address list, but also with the first-order address lists of every other node that it knows about. It will also be understood that each unit can generate a similar tree, with its own unit address at the top.

It can be seen that of the first, second and third connectivity rings 903, 905 and 907 of the first connectivity tree 901 (FIG. 9) is identical to the first, second and third connectivity rings 1003, 1005 and 1007 of the second connectivity tree 1001 (FIG. 10). However, the second connectivity tree 1001 differs from the first connectivity tree 901 in that it has an additional connectivity ring, namely, the fourth connectivity ring 1009. The reason why this fourth connectivity ring 1009 exists in the second connectivity tree 1001 (and, therefore, why the second connectivity tree 1001 contains more information than the first connectivity tree 901) is because the reduction criteria that were applied to the second connectivity tree 1001 were not designed to minimize the number of connectivity rings.

As soon as the connectivity tree in a unit is determined, the connectivity is known because, for each unit in the tree, the address is known and the route to reach it is known. In addition, because the class of service for each unit is known, the capabilities of all units are completely known.

Figure 11:
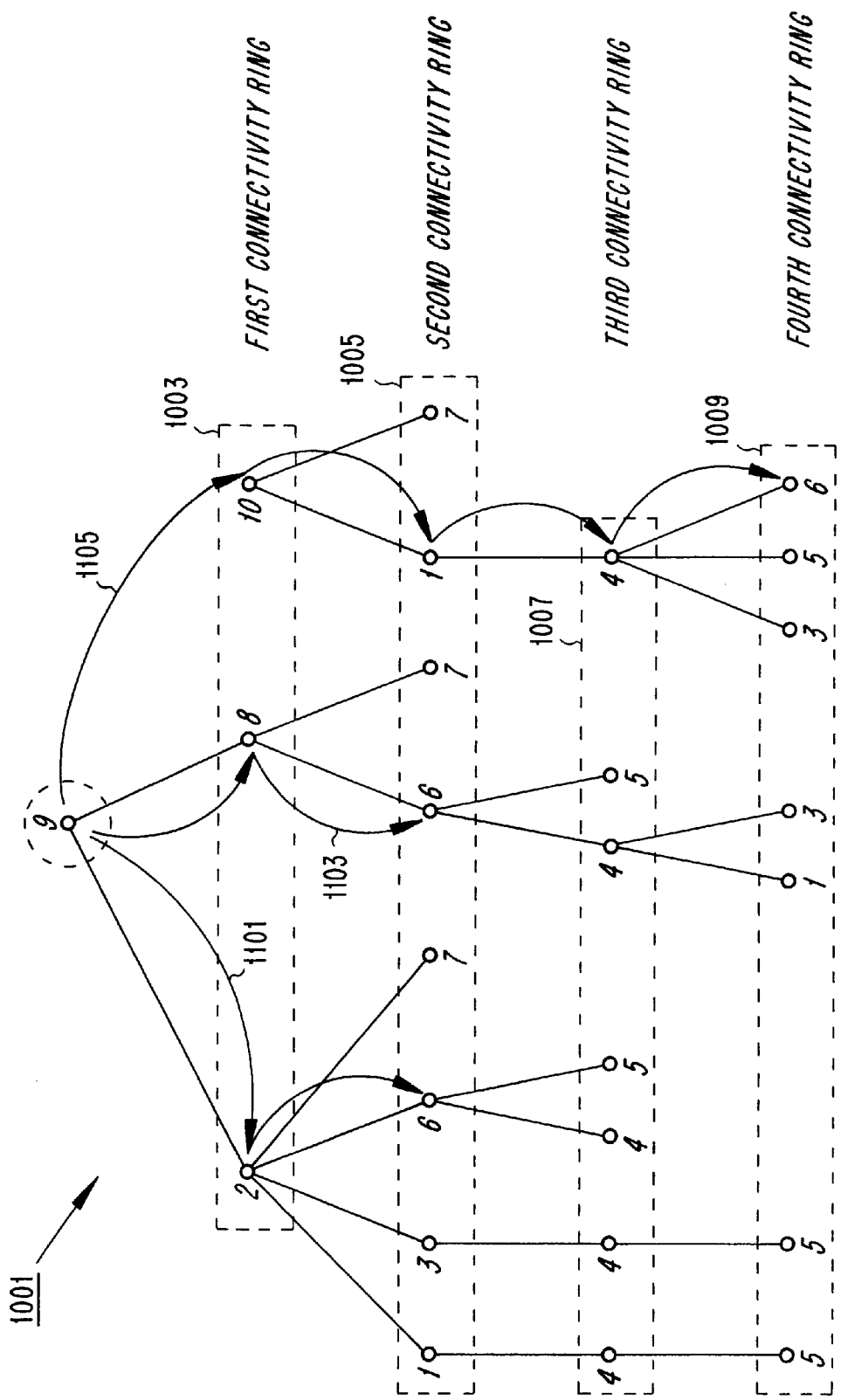
FIG. 11 illustrates the utilization of a connectivity tree to determine possible routes for making a connection, in accordance with one aspect of the invention.

To connect to a unit in the tree, the top unit (acting as source unit) can select routes downwards in order to connect to the destination unit. Different routes can exist. For example, suppose that in the example of FIG. 7, unit 9 wants to connect to unit 6. Referring now to FIG. 11, it can be seen from the second connectivity tree 1001 that there are three different routes that may be followed: a first route 1101, a second route 1103 and a third route 1105. The route selection procedure can be based on any combination of the following factors:

the number of bridge units that have to be used for each of the routes 1101, 1103 and 1105;

whether, for each possible route 1101, 1103 and 1105, the intermediate nodes have the capability of functioning as a bridge units (i.e., whether the intermediate nodes have the capability of relaying the information to be exchanged back and forth and an adequate power supply for doing so);

whether, for each possible route 1101, 1103 and 1105, all bridge units within the route can provide the data rates desired for the connection between the source and destination unit;

whether, for each possible route 1101, 1103 and 1105, each of the bridge units currently has radio resources available to support the relay function;

for each possible route 1101, 1103 and 1105, the number of branches leaving the bridge units. The more branches from a branch unit, the more interference the bridge unit can cause to other units. Conversely, the fewer branches there are from a bridge unit, the better because it will be less interfered by and will produce less interference to other units.

The first condition (i.e., a consideration of the number of bridge units in a given route) can be illustrated when comparing the first, second and third routes 1101, 1103 and 1105. The first route 1101 (i.e., 9→2→6) and the second route 1103 (i.e., 9→8→6) would each require one bridge unit, whereas the third route 1105 (i.e., 9→10→1→4→6) would require three bridge units. Assuming that each of the bridge units in this example can be used as bridge units with the proper characteristics, then the first and second routes 1101 and 1103 should be preferred because of the fewer number of required bridge nodes. However, if in addition, the number of branches leaving the bridge units is important, then the second route 1103 is preferable to the first route 1101 because bridge unit 8 will produce less interference than bridge unit 2. (This conclusion is reached by considering the fact that four branches leave bridge unit 2 compared to only two branches leaving bridge unit 8.)

If, however, units 2 and 8 are portable units, are busy, or cannot relay information, then the only route left is the third route 1105. Note that this alternative route does not exist in the first connectivity tree 901, which was reduced using the criterion of a minimal number of bridges.

Assuming that the second route 1103 is selected, the connection may be established by unit 9 first connecting to unit 8 with a request for unit 8 to act as a bridge unit and to establish a bridge connection to unit 6. Unit 8 will then establish a connection to unit 6, and then link the two connections to units 6 and 9 to provide the second route 1103 (i.e., 9→8→6).

A self-organized wireless LAN (WLAN) technology has been described. As with the standard WLANS, the inventive self-organized WLAN system can make use of a wired LAN to which the individual wireless units form wireless extensions. The desirability of this approach depends on the particular application. In low-cost applications where no LAN exists yet (e.g., residential applications), the self-organized WLAN's plug-and-play scenario with a complete wireless connectivity may be more advantageous than relying on a wired backbone. Both extended range and capacity can be simply obtained by disposing more bridge units at strategic positions. When the wireless units hit a low target price, this will be a cheaper approach than using a wired backbone. A wired backbone would require a complete extra LAN with all its protocols and hardware. Even if a cheap medium like the power supply lines or TV cables are used, the infrastructure required to run information through this medium would still remain. There will always be a need for a converting unit to bridge between the wired LAN and the wireless LAN domain. This converting bridge unit will probably not be cheaper than a purely wireless bridge provided by two wireless transceivers.

Another issue is the wireless extension to an existing wired LAN. One or several wireless units can act as fixed parts within a WLAN. Each fixed wireless unit can set up a piconet and can then act as a master. (Note that several wireless units can be co-located in the same fixed part.) The protocols for the wireless units will only be valid for the lower-level communications. Any wired LAN protocols to be extended to the portable unit should be handled at higher levels; that is the wireless portion of the LAN should be transparent to them. In addition to connections to the fixed points, the portable wireless units in range can always establish an ad-hoc piconet among themselves. This offloads the wired LANs and increases capacity because an intermediary (i.e. the fixed part) is not required if a connection can be established directly.

Figure 12:
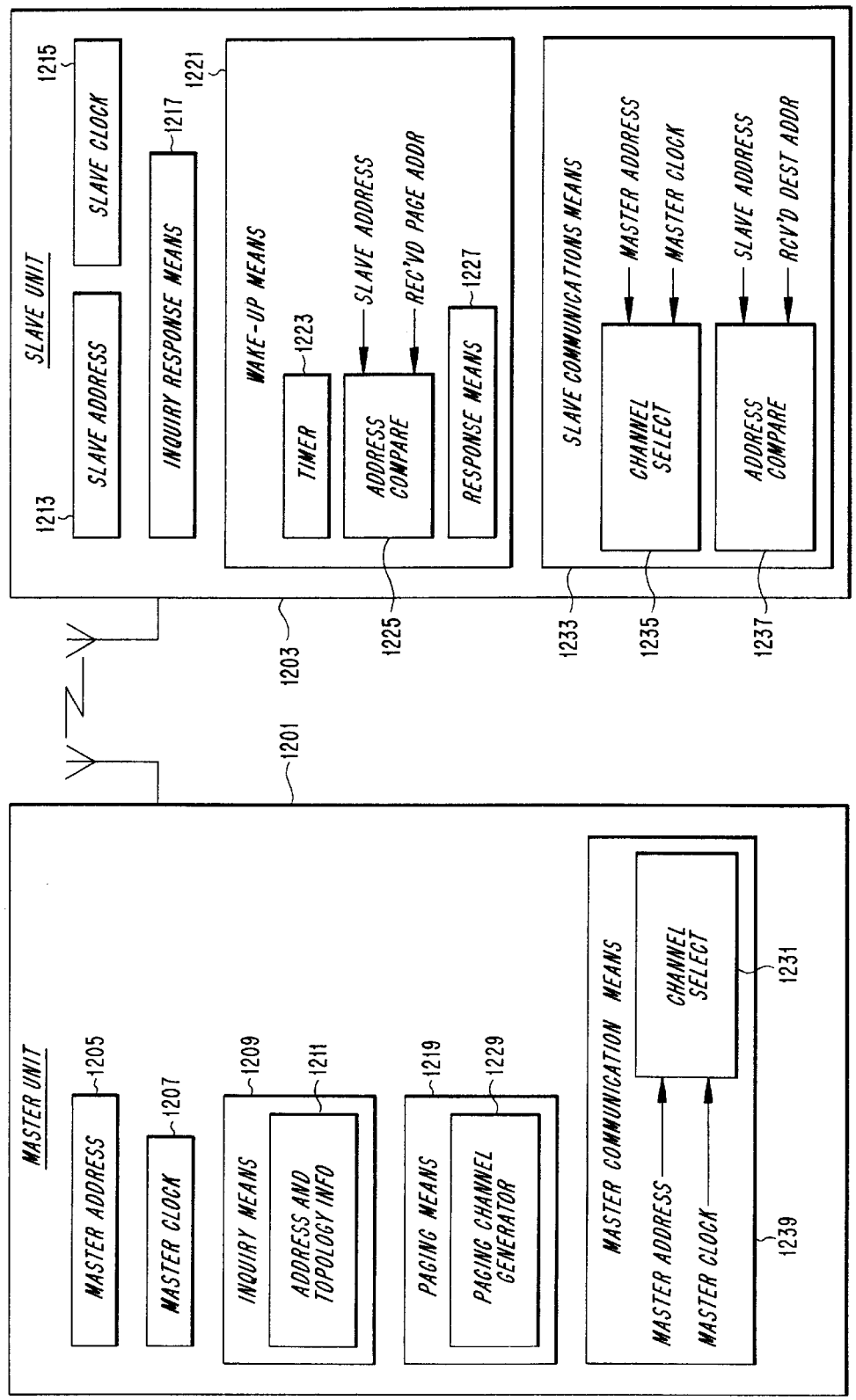
FIG. 12 is a block diagram of an exemplary system for carrying out the various inventive features.

An exemplary system for carrying out the various inventive features will now be described with reference to FIG. 12. Two wireless units are shown: a first unit, designated as a master unit 1201; and a second unit, designated as a slave unit 1203. Each of these units is shown as comprising only those means for carrying out the indicated functions associated with the respective roles of "master" and "slave." It will be recognized, however, that the allocation of roles as exclusively master and exclusively slave is done here merely to facilitate the discussion about the invention, and that the invention encompasses those units that include all of the necessary components for acting as both master and slave. It is further noted that only those components that are directly related to the invention are illustrated. However, those skilled in the art will recognize that each of the master and slave units 1201, 1203 includes additional components, such as transceivers and the like, which are well-known and which are necessary for carrying out the wireless communication aspects of the invention.

Associated with the master unit 1201 is a master address 1205, which is a code that uniquely identifies this unit in the system. The master unit 1201 also includes a master clock 1207.

In order to be able to establish connections, it is necessary for the master unit 1201 to know the addresses of the other units with which a connection can be established. To perform this function, the master unit 1201 includes an inquiry means 1209 that operates as means for sending out inquiry messages as described above. The inquiry means 1209 also collects the responses (address and topology information 1211) and organizes it in accordance with the connectivity tree techniques described above.

The slave unit 1203 is similarly associated with a slave address 1213, and similarly includes a slave clock 1215 which need not be synchronized with the master unit 1201. In order to be able to respond to inquiries from the master unit 1201, the slave unit includes an inquiry response means 1217 whose job is to recognize received inquiries, and to generate and transmit an appropriate response back to the master unit 1201. As indicated earlier, the response may comprise not only the slave address 1213, but also other information such as the slave's class of service, and the slave's present clock reading.

In order to enable the master unit 1201 to establish a connection with the slave unit 1203, it is further provided with a paging means 1219 that sends out a page message as described above. The page message includes the slave address, which information is obtained from the inquiry means 1209. (Of course, if the topology requires that the connection be established through a bridge node (not shown), the page message would include the address of the bridge node. In one embodiment, the page message may also include a request to establish a connection with the slave unit 1203. In an alternative embodiment, the page message serves only to establish a connection with the bridge node. After the bridge node connection is established, the master unit 1201 then issues a request for the bridge to establish a connection with the slave unit 1203.)

When not in use, the slave unit 1203 is preferably in a standby mode. Accordingly, a wake-up means 1221 is provided in the slave unit 1203. The wake-up means 1221 includes a timer 1223 which causes the slave unit 1203 to wake up periodically to determine whether a received page message is intended for this slave unit 1203. An address compare unit 1225 is provided for this purpose. If the slave address 1213 matches the received page address, then response means 1227 within the wake-up means 1221 generates and transmits an appropriate response back to the master unit 1201.

One aspect of the present invention is the fact that both the master unit 1201 and the slave unit 1203 utilize a frequency hopping communication system. As a consequence of this, the slave unit 1203 wakes up in any one of a number of predetermined paging hop frequencies. Because the master unit 1201 does not know exactly in which hop frequency the slave unit 1203 will awaken, it retransmits the page message with a high repetition rate in different hops. It uses the wake-up hops and the wake-hop sequence of the recipient, and tries to reach the recipient by sending the page message at as many different hops as possible. The sequence of wake-up hops is generated by a paging channel generator 1229 within the paging means 1219. A preferred technique for accessing a unit that is in standby mode is more fully described in the above-referenced U.S. patent application Ser. No. 08/771,692, entitled "Access Technique of Channel Hopping Communications System" and filed on Dec. 23, 1996 in the name of Haartsen et al.

Once a connection has been established, the master unit 1201 conveys its master address 1205 and master clock 1207 to the slave unit 1203. The master address 1205 and master clock 1207 are then used to define the virtual frequency hopping channel that will be used in communications between the master unit 1201 and the slave unit 1203. In the master unit 1201, master communication means include a channel select unit 1231 that generates the hop frequencies at appropriate times, based on the master address 1205 (which determines the hop sequence) and the master clock 1207 (which determines the phase within the hop sequence).

In the slave unit 1203, a channel select unit 1235 is similarly included within slave communications means 1233 in order to generate the hop frequencies at appropriate times, based on the master address (which determines the hop sequence) and the master clock 1207. In a preferred embodiment, it is unnecessary for the slave unit 1203 to reset its slave clock 1215 to match that of the master unit 1201. Instead, when the master clock 1207 is first received by the slave unit 1203, the difference between the master clock 1207 and the slave clock 1215 is determined and stored. Then, whenever a current master clock value is needed within the slave unit 1203, it is calculated based on the stored difference and the current slave clock 1215.

In order to accommodate the possibility that more than one slave unit 1203 may be connected to the same master unit 1201, the slave unit 1203 further includes a second address compare unit 1237. As mentioned earlier, each communication in the piconet includes the address of the intended recipient. Thus, the purpose of the second address compare unit 1237 is to compare a received destination address with the slave unit's own slave address 1213 to determine whether it is the intended recipient of a received communication.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A wireless network comprising:
   a master unit; and
   a slave unit,
   wherein the master unit comprises:
      means for sending a master address to the slave unit;
      means for sending a master clock to the slave unit; and
      means for communicating with the slave unit by means of a virtual frequency hopping channel;
   wherein the slave unit comprises:
      means for receiving the master address from the master unit;
      means for receiving the master clock from the master unit; and
      means for communicating with the master unit by means of the virtual frequency hopping channel; and
   wherein:
      a hopping sequence of the virtual frequency hopping channel is a function of the master address, and the master address is a unique unit identifying address; and
      a phase of the hopping sequence is a function of the master clock.

2. The wireless network of claim 1, wherein:
   the master unit further comprises means for transmitting an inquiry message that solicits a slave address from the slave unit, wherein the slave address is a unique unit identifying address; and
   the slave unit further comprises:
      means for receiving the inquiry message; and
      means, responsive to the inquiry message, for transmitting the slave address to the master unit.

3. The wireless network of claim 2, wherein the master unit further comprises:
   means for receiving slave address and topology information from more than one slave unit; and
   means for generating a configuration tree from the address and topology information.

4. The wireless network of claim 3, wherein the master unit further includes means for utilizing the configuration tree to determine a route for a connection between the master unit and the slave unit.

5. The wireless network of claim 3, wherein:
   the slave address and topology information comprises an own address from each of the more than one slave units and only first order address lists from each of the more than one slave units; and
   the means for generating the configuration tree from the address and topology information comprises:
      means for generating n connectivity rings from the first order address lists, wherein n is a positive integer, and wherein the generating means generates each of the connectivity rings in accordance with a rule that a higher-numbered connectivity ring cannot include nodes representing units that are already represented by a node in a lower-numbered connectivity ring.

6. The wireless network of claim 3, wherein:
   the slave address and topology information comprises an own address from each of the more than one slave units and only first order address lists from each of the more than one slave units; and
   the means for generating the configuration tree from the address and topology information comprises:
      means for generating n connectivity rings from the first order address lists, wherein n is a positive integer, and wherein the generating means generates each of the connectivity rings by considering a present numbered connectivity ring having parent nodes, and including in a next higher-numbered connectivity ring those nodes representing all children of the parent nodes that satisfy the following rules:
         no descendant of a parent can represent the same unit as is represented by the parent;
         no descendant of a child of the parent can represent the same unit as any of the children of the parent; and
         no child of any parent can have the same name as any other child of said any parent.

7. A method for generating a connectivity tree for use in determining a connection route between a first wireless unit and any of a number of other wireless units, the method comprising the steps of:
   in the first wireless unit, receiving address and topology information from each of the other wireless units, wherein the address and topology information comprises an own address from each of the other wireless units and only first order address lists from each of the other wireless units; and
   in the first wireless unit, generating n connectivity rings from the first order address lists, wherein n is a positive integer, and wherein each of the connectivity rings is generated in accordance with a rule that a higher-numbered connectivity ring cannot include nodes representing units that are already represented by a node in a lower-numbered connectivity ring.

8. A method for generating a connectivity tree for use in determining a connection route between a first wireless unit and any of a number of other wireless units, the method comprising the steps of:
   in the first wireless unit, receiving address and topology information from each of the other wireless units, wherein the address and topology information comprises an own address from each of the other wireless units and only first order address lists from each of the other wireless units; and
   in the first wireless unit, generating n connectivity rings from the first order address lists, wherein n is a positive integer, and wherein each of the connectivity rings is generated by considering a present numbered connectivity ring having parent nodes, and including in a next higher-numbered connectivity ring those nodes representing all children of the parent nodes that satisfy the following rules:
      no descendant of a parent can represent the same unit as is represented by the parent;
      no descendant of a child of the parent can represent the same unit as any of the children of the parent; and
      no child of any parent can have the same name as any other child of said any parent.

9. A wireless network having a scatter topology, the wireless network comprising:
   a first master unit;
   a second master unit;
   a first slave unit; and
   a second slave unit,
   wherein the first master unit comprises:
      means for sending a first master address to the first slave unit;
      means for sending a first master clock to the first slave unit; and
      means for communicating with the first slave unit by means of a first virtual frequency hopping channel;
   wherein the first slave unit comprises:
      means for receiving the first master address from the first master unit;
      means for receiving the first master clock from the first master unit; and
      means for communicating with the first master unit by means of the first virtual frequency hopping channel;
   wherein the second master unit comprises:
      means for sending a second master address to the second slave unit;
      means for sending a second master clock to the second slave unit;
      means for communicating with the second slave unit by means of a second virtual frequency hopping channel;
   wherein the second slave unit comprises:
      means for receiving the second master address from the second master unit;
      means for receiving the second master clock from the second master unit; and
      means for communicating with the second master unit by means of the first virtual frequency hopping channel; and
   wherein:
      a first hopping sequence of the first virtual frequency hopping channel is a function of the first master address, and the first master address is a unique unit identifying address;
      a phase of the first hopping sequence is a function of the first master clock;
      a second hopping sequence of the second virtual frequency hopping channel is a function of the second master address;
      a phase of the second sequence is a function of the second master clock;
      the first master clock is uncoordinated with the second master clock; and
      the first virtual frequency hopping channel uses the same radio spectrum as the second virtual frequency hopping channel,
      whereby the first virtual frequency hopping channel is different from the second virtual frequency hopping channel, thereby permitting communication between the first master unit and the first slave unit to take place without substantially interfering with communication between the second master unit and the second slave unit.

10. The wireless network of claim 9, wherein:
    each of the first and second master units further comprises means for transmitting an inquiry message that solicits a slave address from the first and second slave units; and
    each of the first and second slave units further comprises:
       means for receiving the inquiry message; and
       means, responsive to the inquiry message, for transmitting the slave address to the first and second master units.

11. The wireless network of claim 10, wherein each of the first and second master units further comprises:
    means for receiving slave address and topology information from more than one slave unit; and
    means for generating a configuration tree from the address and topology information.

12. The wireless network of claim 11, wherein each of the first and second master units further includes means for utilizing the configuration tree to determine a route for a connection between the first and second master unit and the respective first and second slave units.

13. The wireless network of claim 11, wherein:
    the slave address and topology information comprises an own address from each of the more than one slave units and only first order address lists from each of the more than one slave units; and
    the means for generating the configuration tree from the address and topology information comprises:
       means for generating n connectivity rings from the first order address lists, wherein n is a positive integer, and wherein the generating means generates each of the connectivity rings in accordance with a rule that a higher-numbered connectivity ring cannot include nodes representing units that are already represented by a node in a lower-numbered connectivity ring.

14. The wireless network of claim 11, wherein:
    the slave address and topology information comprises an own address from each of the more than one slave units and only first order address lists from each of the more than one slave units; and
    the means for generating the configuration tree from the address and topology information comprises:
       means for generating n connectivity rings from the first order address lists, wherein n is a positive integer, and wherein the generating means generates each of the connectivity rings by considering a present numbered connectivity ring having parent nodes, and including in a next higher-numbered connectivity ring those nodes representing all children of the parent nodes that satisfy the following rules:
- no descendant of a parent can represent the same unit as is represented by the parent;
- no descendant of a child of the parent can represent the same unit as any of the children of the parent; and
- no child of any parent can have the same name as any other child of said any parent.

15. The network of claim 1, wherein the unique unit identifying address is 64 bits long.

16. The network of claim 1, wherein the virtual frequency hopping channel is includes 79 hops of 1 MHZ width.

17. The network of claim 1, wherein only one packet is transmitted between the master unit and slave unit per frequency hop.

18. The network of claim 1, wherein packets transmitted from the master unit and from the slave unit include the master unit's unique unit identifying address.

19. The network of claim 1, wherein the network further comprises:
another slave unit, wherein the slave unit and the another slave unit can communicate with each other over the frequency hopping channel only through the master unit.

20. The network of claim 19, wherein the slave and the another slave each have a unique unit identifying address and the slave and the another slave is identified in the network by a member address.

21. The network of claim 20, wherein the member address is a three bit address.

22. The network of claim 1, wherein the virtual frequency hopping channel includes a plurality of time division duplex frames, each time division duplex frame consisting of a transmit slot and a receive slot.

23. The network of claim 1, wherein the slave examines each received packet to determine whether the packet includes the master node's unique unit identifying address.

24. The network of claim 1, wherein the network implements an automatic retransmission query (ARQ) scheme for transmitted packets.

25. The network of claim 24, wherein the success or failure of a packet in a frame is indicated in a succeeding frame.

26. The network of claim 19, wherein if the slave unit and the another slave unit need to communicate directly with one another, the slave unit and the another slave unit communicate over another virtual frequency hopping sequence, wherein the hop sequence of the another virtual frequency hopping sequence is a function of an address of the slave unit or the another slave unit, and the phase of the hopping sequence is a function of the clock of the slave unit or the another slave unit.

27. The network of claim 1, wherein the slave unit does not reset its clock to correspond to the master clock.

28. A wireless network comprising:
a master unit; and
a slave unit,
wherein the master unit comprises:
- means for sending a master address to the slave unit;
- means for sending a master clock to the slave unit;
- means for communicating with the slave unit by means of a virtual frequency hopping channel;
- means for transmitting an inquiry message that solicits the slave address from the slave unit; and
- means for transmitting a page message that includes a request to establish a connection with the slave unit;

wherein the slave unit comprises:
- means for receiving the master address from the master unit;
- means for receiving the master clock from the master unit;
- means for communicating with the master unit by means of the virtual frequency hopping channel;
- means for receiving the inquiry message;
- means, responsive to the inquiry message, for transmitting the slave address to the master unit; and wherein:
- a hopping sequence of the virtual frequency hopping channel is a function of the master address; and
- a phase of the hopping sequence is a function of the master clock.

* * * * *

UNITED STATES PATENT AND TRADEMARK OFFICE
CERTIFICATE OF CORRECTION

PATENT NO. : 6,590,928 B1
DATED : July 8, 2003
INVENTOR(S) : Haartsen

It is certified that error appears in the above-identified patent and that said Letters Patent is hereby corrected as shown below:

Column 6,
Line 46, delete "first", and add -- second --.

Column 23,
Line 63, delete "first", and add -- second --.

Signed and Sealed this

Sixth Day of September, 2005

JON W. DUDAS
*Director of the United States Patent and Trademark Office*